July 17, 1956
K. SOMMER
2,754,956
CONVEYOR STRUCTURE FOR FLAT GLASS EDGING
BEVELING AND POLISHING APPARATUS
Filed May 2, 1951
4 Sheets-Sheet 1
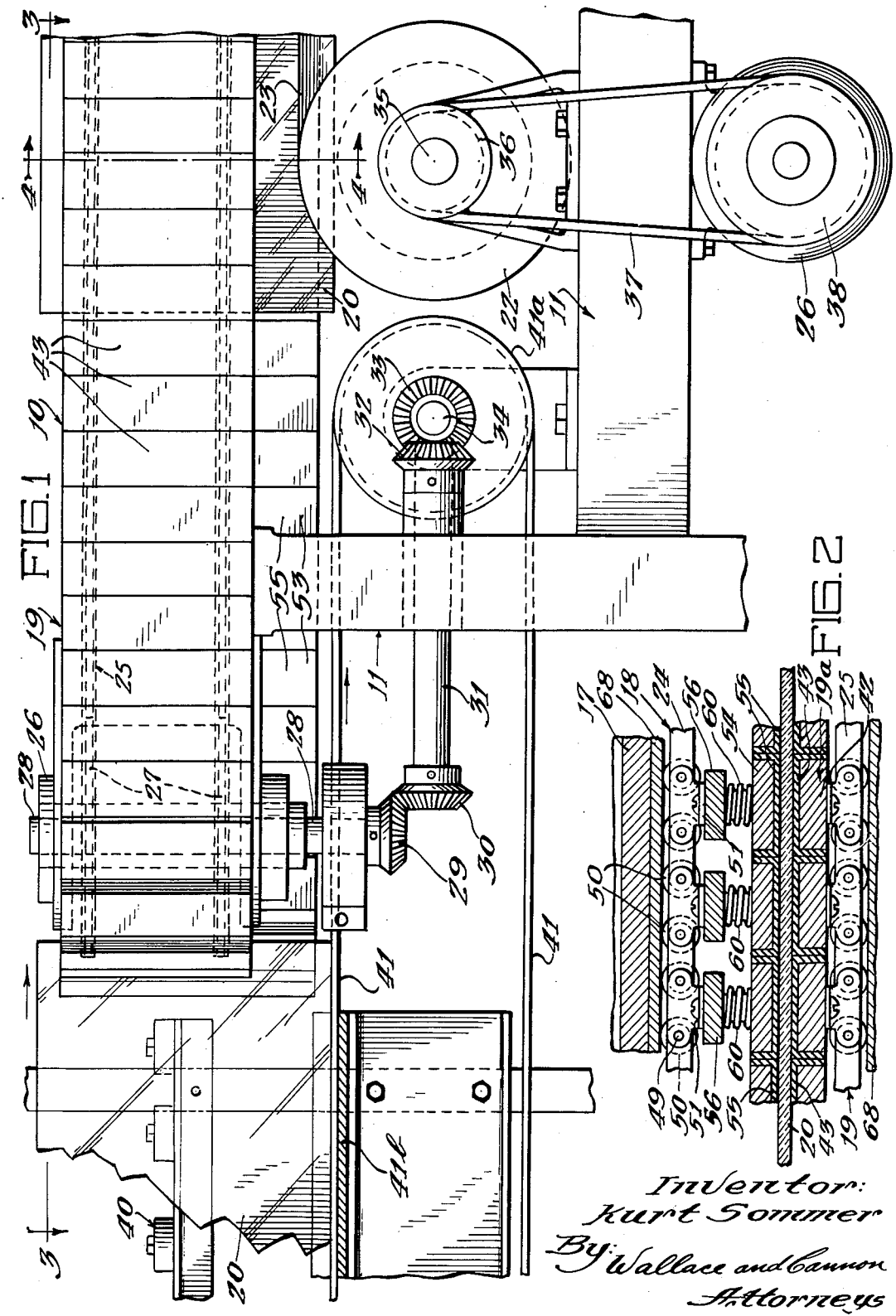
Inventor:
Kurt Sommer
By Wallace and Cannon
Attorneys

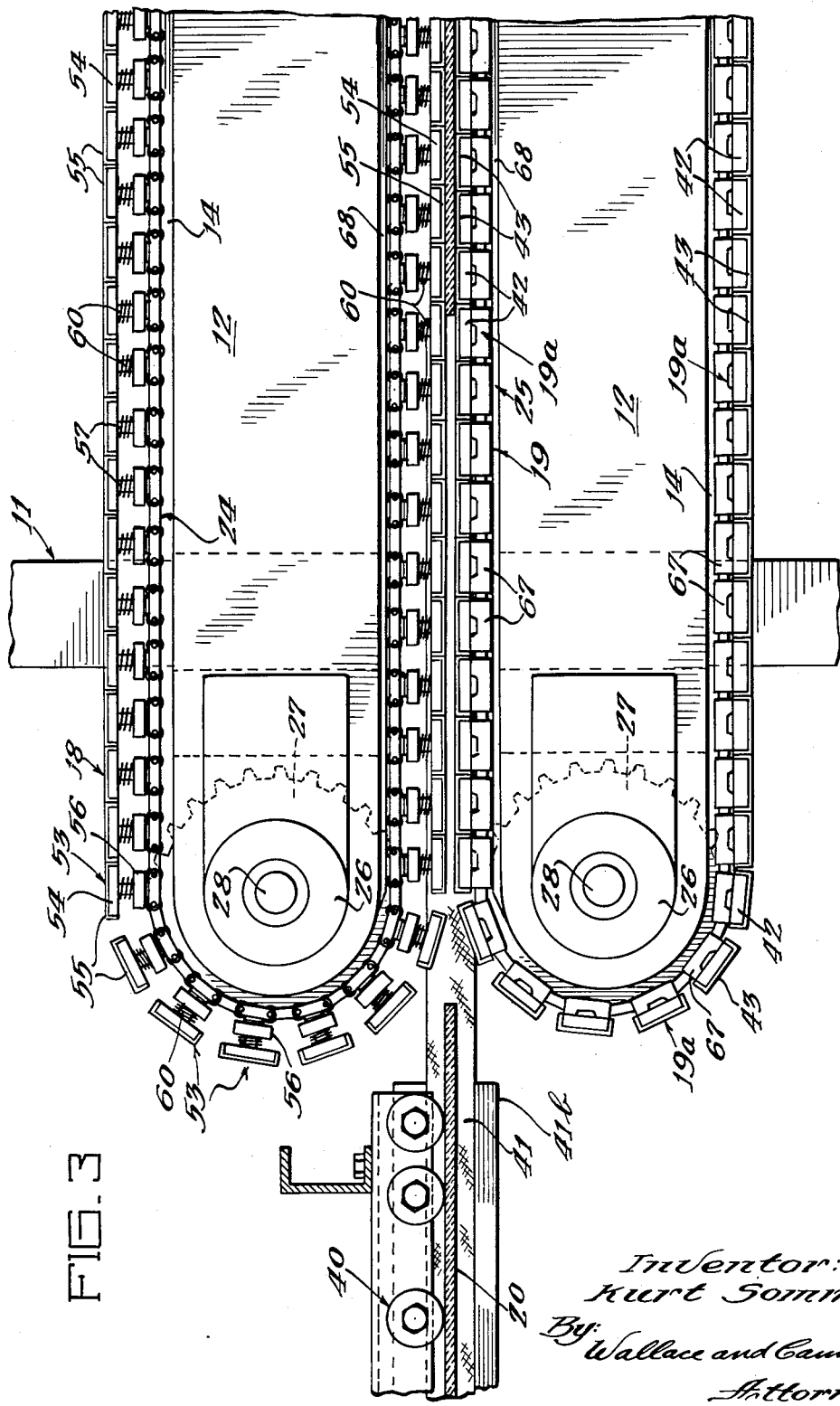

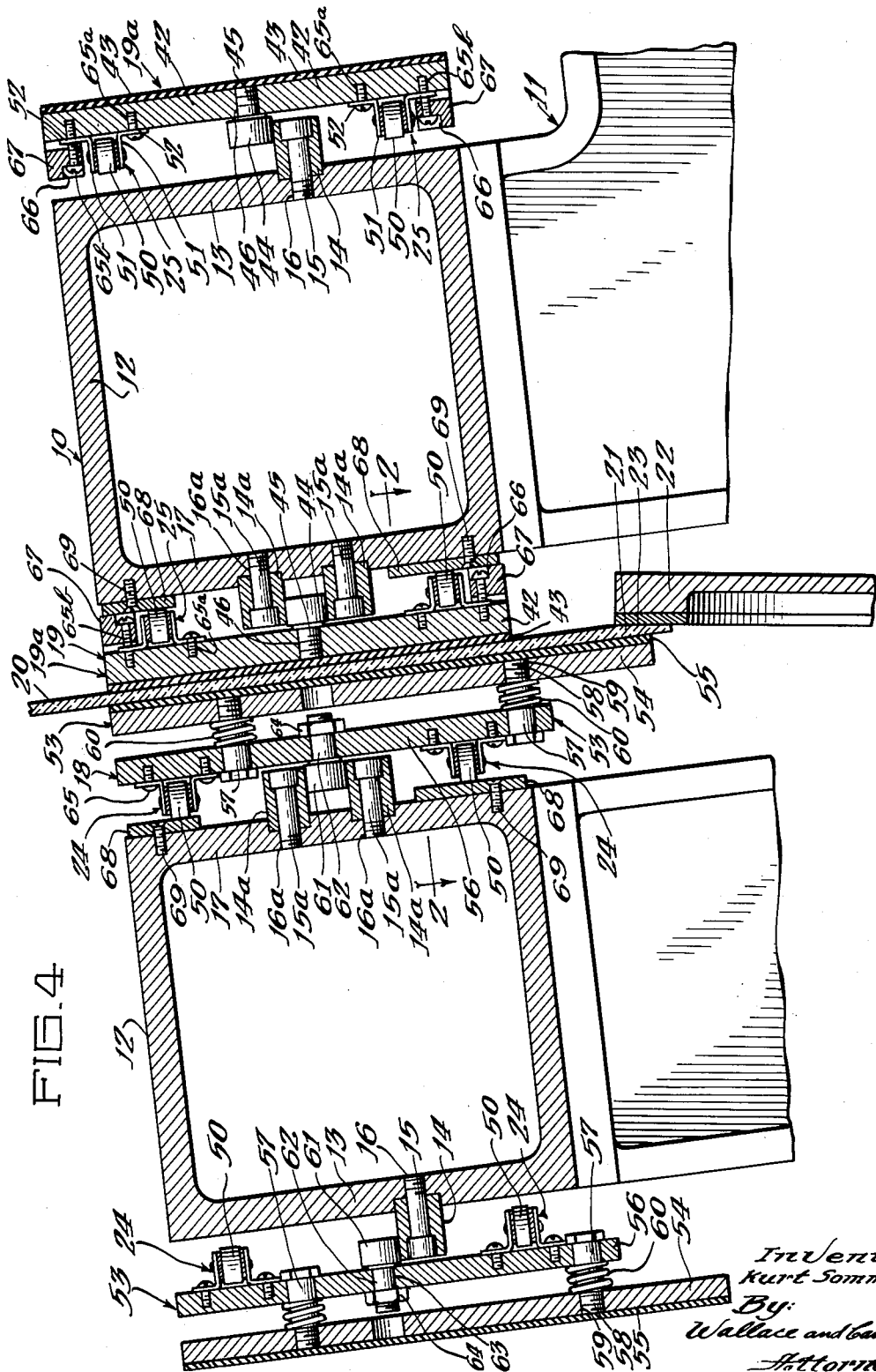

July 17, 1956
K. SOMMER
2,754,956
CONVEYOR STRUCTURE FOR FLAT GLASS EDGING
BEVELING AND POLISHING APPARATUS
Filed May 2, 1951
4 Sheets—Sheet 4
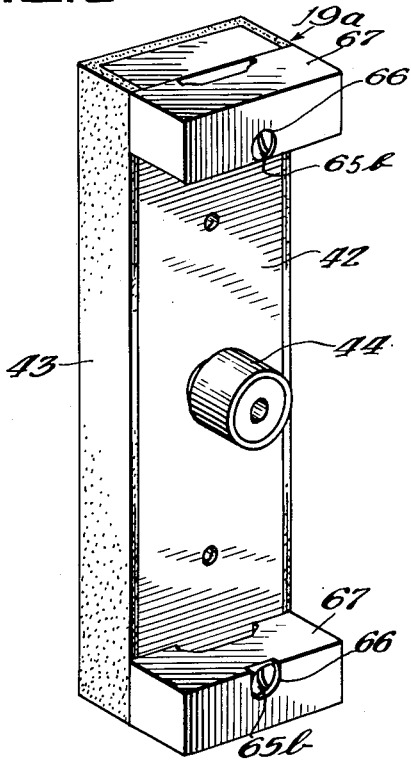
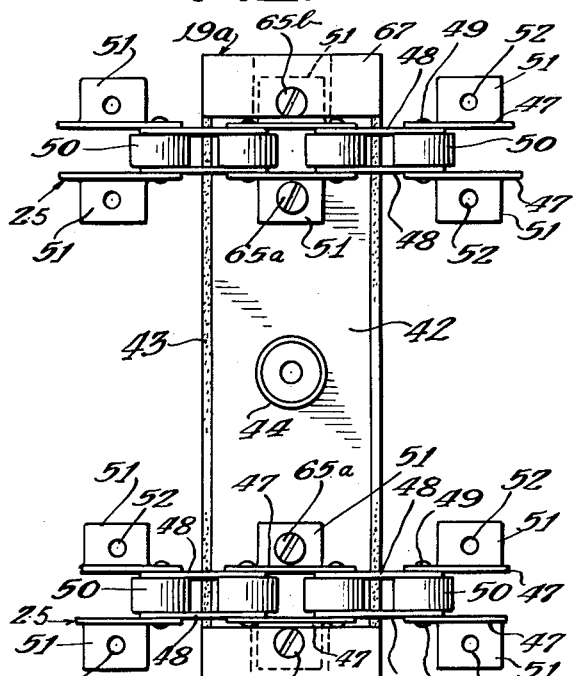
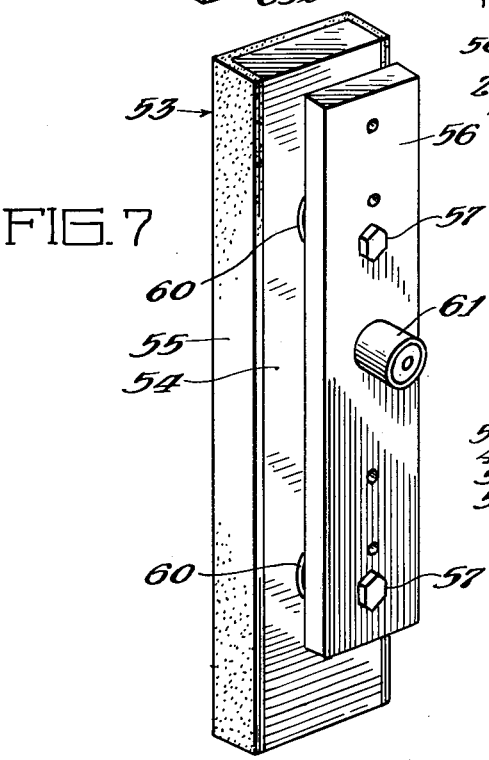
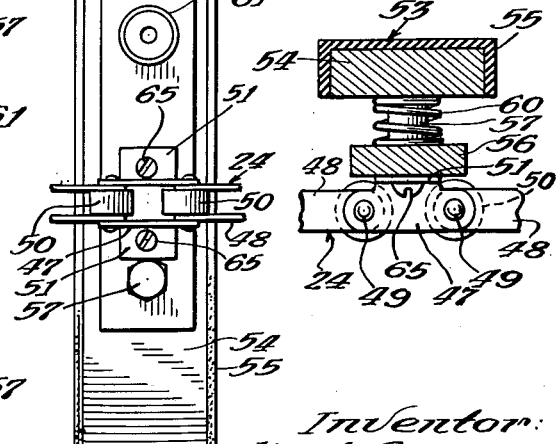
Inventor:
Kurt Sommer
By Wallace and Cannon
Attorneys United States Patent Office 2,754,956
Patented July 17, 1956

2,754,956

CONVEYOR STRUCTURE FOR FLAT GLASS EDGING BEVELING AND POLISHING APPARATUS

Kurt Sommer, La Grange, Ill., assignor to Sommer & Maca Glass Machinery Co., Chicago, Ill., a corporation of Illinois Application May 2, 1951, Serial No. 224,211

3 Claims. (Cl. 198—162)

This invention relates to conveyor structure or mechanism for flat glass edging, beveling and polishing apparatus.

More particularly, this invention relates to gripping devices which are embodied in the new endless conveyor for successively gripping the sides of sheets of flat glass as the latter are fed in a generally upright position between the conveyor mechanisms.

An object of the present invention is to provide a new and improved conveyor mechanism for use in a flat glass edging, beveling and polishing machine.

Another object of the invention is to provide new and improved gripping devices for use in the new conveyor mechanisms and which, in use, will effectively but resiliently and yieldably grip the lateral or side faces of sheets of flat glass as the latter are fed in a generally upright position into position between the endless conveyor mechanisms to the end that the flat glass sheets will be firmly but resiliently held against lateral or sidewise motion or vibration during their advancing movement through the machine and while a lower edge portion thereof is being subjected to the edging, beveling and polishing actions of the edging, beveling and polishing wheels, respectively.

Another object of the present invention is to provide a novel construction for mounting the gripping devices upon and into assembled relationship with the endless conveyor chains which are embodied in the new endless conveyor mechanisms.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art.

In the drawings:

Fig. 1 is a fragmentary side elevational view of a flat glass edging, beveling and polishing machine embodying the present invention;

Fig. 2 is a fragmentary sectional detail view illustrating the construction of one of the new resilient flat glass gripping units embodied in the present invention;

Fig. 3 is a fragmentary top plan view, partly in section on line 3—3 in Fig. 1, of an endless conveyor structure for a flat glass edging, beveling and polishing machine embodying the present invention;

Fig. 4 is an enlarged transverse vertical sectional view on line 4—4 in Fig. 1;

Fig. 5 is a perspective view of one of a resilient gripping pad embodied in one of the gripping units which are embodied in the present invention;

Fig. 6 is an elevational view of one of the new resilient and yieldable gripping units embodying the present invention and as assembled in position of use;

Fig. 7 is a perspective view illustrating the construction of the other of the gripping units embodied in the presentt invention;

Fig. 8 is an elevational view of the new gripping unit shown in Fig. 7 and showing the same assembled in position of use; and Fig. 9 is a sectional plan view on line 9—9 of Fig. 8.

A typical embodiment of a flat glass edging, beveling and polishing machine embodying the present invention is fragmentarily illustrated in the drawings, and is therein generally indicated at 10 (Fig. 1), and comprises a supporting frame structure 11 which supports a pair of elongated stationary metallic endless conveyor guideways 12 which are generally square or rectangular in cross section (Fig. 4). Mounted in the outer wall 13 of each of the stationary metallic guideways 12 is a generally horizontally extending row of spaced stationary anti-friction bearing guide members 14, each of which is mounted on a supporting element in the form of a bolt 15 which is threaded into a suitable threaded opening 16 in each outer side wall 13. Similarly, two vertically spaced and generally horizontally extending rows of spaced stationary anti-friction bearing guide members 14a are mounted on supporting elements in the form of bolts 15a which are mounted in suitable threaded openings 16a formed in the inner side walls 17 of the elongated stationary guide members 12, as best shown in Fig. 4.

The new endless conveyor structure includes a pair of endless conveyor units 18 and 19 which are adapted to travel around the stationary guideways 12 and these endless conveyor units 18 and 19 are adapted to grip and to move successively a series of sheets of flat glass 20 in a generally upright position through the flat glass edging, beveling and polishing machine 10 which embodies the present invention to the end that the lower end portion 21 of each of the flat glass sheets 20 may be successively engaged by suitable edge beveling or grinding wheels 22, and polishing wheels (not shown), so that a beveled and polished edge 23 may be provided upon each of the flat glass sheets 20. The position of the flat glass sheets 20 may be changed after the first run through the machine so that two or all of the edges of each of the flat glass sheets 20 may be provided with a beveled and polished edge 23.

The endless conveyor unit 18 embodies a pair of vertically spaced endless sprocket chains 24 and the endless conveyor unit 19 embodies a generally similar pair of vertically spaced endless sprocket chains 25. These endless sprocket chains 24 and 25 are driven by suitable sprocket gears 27 (Fig. 3) and suitable power transmission apparatus including shafts 28, on which the sprocket gears 27 are mounted, gears 29 carried by the shafts 28, gears 30, shafts 31, gears 32—33, shaft 34, and other suitable parts driven by a suitable motor (not shown), all of these parts being suitably mounted upon the supporting frame 11.

The edge beveling grinding wheels 22 are mounted on shafts 35, which are mounted in the supporting frame 11, and which are driven by power-transmission belts 37 and pulleys 36 and 38 (Fig. 1), driven by a suitable motor 26.

The flat glass plates 20 are successively introduced into position between the endless conveyor units 18 and 19 of the endless conveyor structure by suitable guiding and directing means 40 which includes a flat horizontally extending endless conveyor belt 41 which is driven by a pulley 41a attached to the shaft 34 (Fig. 1). This endless conveyor belt 41 works over a stationary flat bed or guideway 41b which is arranged at the front or lead-in end of the machine (Fig. 1) for advancing the flat glass sheets 20 in a generally upright position successively into position between the endless conveyor units 18 and 19 so that their lower edge portions may be successively engaged and edge beveled and polished by the edge beveling grinding wheels 22 and polishing wheels, respectively.

It will be noted, in this connection, that the arrangement of the stationary guideways 12 and the endless conveyor units 18 and 19 is such that the endless conveyor units 18 and 19 are positioned at an acute angle of about 15° from the horizontal, as seen in Fig. 4, whereas the edge beveling grinding wheels 22 (and polishing wheels not shown) are arranged in a vertical plane so that the flat glass sheets 20 are held by and are successively advanced by the endless conveyor units 18 and 19 into engagement with the edge beveling and grinding wheels 22 and polishing wheels (not shown) in a generally upright position but at an angle of about 15° from the vertical, as seen in Fig. 4, to enable the edge beveling and grinding wheels (and the polishing wheels not shown) to provide the desired beveled and polished edge 23 on the flat glass sheets 20. However, the arrangement shown is merely illustrative since the angle between the flat glass sheet and the guiding wheels 22 (and polishing wheels not shown) may be varied and may be any desired angle from 10 or less to 90°.

As shown in the drawings, the new endless conveyor unit 19 includes an endless row of articulated and resilient but relatively non-yielding gripping devices or units 19a each of which includes a generally channel-shaped rubber or like resilient gripping pad 43 which is adhesively attached to a metallic rigid supporting block 42 (Fig. 5). Each of the supporting blocks 42 has an anti-friction roller 44 mounted therein, between the upper and lower ends thereof, and each of these anti-friction rollers 44 is carried by a supporting stud 45 which is threaded into a suitable threaded opening 46 formed in the corresponding supporting block 42 (Fig. 4).

As shown, (Fig. 4) the anti-friction rollers 44, which are embodied in the endless conveyor unit 19, during the outer run of the endless conveyor 19, travel over the row of spaced stationary guide members 14 as the endless conveyor unit 19 travels about the stationary guideway 12. Likewise, as the endless conveyor unit 19 travels about the stationary guideway 12, during the inner run of the endless conveyor unit 19, the anti-friction rollers 44 carried thereby travel between the two vertically spaced but generally horizontally extending rows of stationary anti-friction guide members 14a which are mounted on the inner wall 17a of the stationary guideway 12 (Fig. 4).

The new endless conveyor unit or mechanism 18 is similar to the endless conveyor unit or mechanism 19 but differs therefrom in that it includes an endless row of resilient and yieldable articulated flat glass plate gripping units 53 (Fig. 7) each of which includes a rigid metallic plate or supporting block 54 having a resilient surface in the form of a channel-shaped pad 55 of rubber or like yieldable material adhesively fastened thereto on the outer face thereof. Each of the gripping units 53 also includes a backing plate 56 which is mounted on supporting elements in the form of studs 57 having threaded end portions 58 which are threaded into threaded openings 59 formed in the rigid metallic plates 54. Each of the supporting elements or studs 57 has yieldable means in the form of a coil spring 60 mounted thereon between the backing plate 56 and the adjacent rigid supporting block 54. As is apparent, these coil springs 60 normally urge the supporting blocks 54 and their attached resilient gripping pads 55 away from the relatively non-yieldable backing plates 56 and into yieldable and resilient gripping action with the adjacent side surface or lateral face of one of the flat glass plates 20 as the latter are fed successively into position between the endless conveyor units 18 and 19.

Anti-friction rollers 61 are mounted on studs or bolts 62 carried by the backing plate 56 and during movement of the endless conveyor unit 18 about the corresponding stationary guideway 12 the anti-friction rollers 61 travel over and ride upon the guide members 14, during the outer run of the endless conveyor unit 18 and during the inner run of the endless conveyor unit 18 the anti-friction rollers 61 travel between the vertically spaced runs of horizontally extending guide members 14a.

Each of the studs or bolts 62 is mounted in an opening 63 formed in the backing plate 56 and each of the studs or bolts 62 has a nut 64 threaded thereon between the backing plate 56 and the adjacent yieldable and resilient gripping pad unit or assembly 53.

It will be noted by reference to Figs. 4, 6, 8 and 9 that each of the two endless sprocket chains 24 which are embodied in the endless conveyor unit 18 includes spaced pairs of outer links 47 and spaced pairs of inner links 48 which are arranged inwardly of the outer links 47 and extend parallel thereto and are pivotally interconnected therewith, as by pintles 49 each having an antifriction roller 50 rotatably mounted thereon between a corresponding pair of the inner links 48 (Figs. 6, 8 and 9). Each of the outer links 47 has a laterally extending attaching flange portion 51 and each of these attaching flange portions 51 is provided with an aperture or hole 52, for a purpose which will be explained presently.

A fastening element in the form of a bolt 65 is extended through the aperture 52 in the attaching flange 51 of each of the outer links 47 for attaching the attaching flange portions 52 of the outer links 47 to the backing plates 56 and thereby mounting the backing plates 56 and the resilient and yieldable gripping units 53 on a corresponding one of the endless conveyor chains 24 embodied in the endless conveyor unit 18. A similar arrangement is employed for mounting the blocks 42 of each of the resilient but non-yielding gripping units 19a on the endless conveyor 25 which is embodied in the endless conveyor unit 19.

As will be seen by reference to Figs. 4, 5 and 6, each of the resilient but non-yieldable gripping units 19a is mounted on one of the endless conveyor sprocket chains 25 by means of fastening elements, in the form of bolts 65a and 65b, which correspond to the fastening elements or bolts 65. Each of these fastening elements or bolts 65a is extended through an opening or aperture 52 formed in the attaching flange 51 on the inner one of each pair of outer links 47 in the corresponding sprocket chain 25 (Fig. 4). A relatively longer fastening element or bolt 65b is employed to fasten the attaching flange 51 on the outer one of each pair of outer links 47 to the block 42 which is embodied in each non-yieldable gripping unit 19a. The heads of the relatively longer fastening elements or bolts 65b are disposed in countersunk recesses 66 which are formed in blocks 67 a pair of which are mounted in spaced relationship on each block 42, one at the top and one at the bottom thereof. Thus each of the bolts or fastening elements 65b extends through an opening in one of the blocks 67 and thence through an opening 52 in the attaching flange 51 of a corresponding one of the outer links 47 aligned therewith and thence into the block 42 of the corresponding non-yielding gripping unit 19a, as shown in Fig. 4.

A pair of generally horizontally extending but vertically spaced wear strips 68 are mounted on each of the inner walls 17 of each of the stationary guideways 12, being attached thereto by suitable fastening elements 69 (Fig. 4).

In the use of a flat glass edging, beveling and polishing machine embodying the new endless conveyor structure, sheets 20 of flat glass are directed by the guiding apparatus 40 and endless belt conveyor 41 into the space between the two endless conveyor units 18 and 19 which are moved or rotated by the power-transmission apparatus 27, 28, 29, 30, 31, 32, 33, 34, 35, and 36 as the edge beveling grinding wheels 22 and polishing wheels (not shown) are rotated by suitable power-transmission apparatus such as the parts 35, 36, 37 and 38.

As each flat glass sheet 20 enters the space between the endless conveyors 18 and 19, in upright position, as shown in Fig. 4, one lateral or side face of each flat glass sheet 20 bears against and is successively gripped by the resilient surfaces or pads 43 of a group of the resilient but relatively non-yieldable gripping units 19a whereas the other lateral surface or side face of each flat glass sheet 20 is successively gripped by the resilient faces or pads 55 of a group of the yieldable and resilient gripping units 53, and the flat glass plates 20 are thus successively advanced into and through the edge beveling and polishing machine as the endless conveyor units 18 and 19 are operated.

It will be noted, in this connection, that the resilient gripping surface or pad 55 of each of the resilient and yieldable gripping units 53 is urged, by one of the coil springs 60, into yieldable gripping or clamping engagement with the lateral face of one of the flat glass sheets 20 as the latter are successively advanced through the machine and in this manner each of the flat glass sheets 20 is held under a slight gripping or clamping pressure between groups of pairs of the gripping units 19a and 53 and in this manner the flat glass plates 20 are firmly held against lateral movement and against lateral vibration as they travel through the machine during the edge beveling and polishing operations.

As the flat glass plates 20 are thus moved through the machine the lower end portions 21 thereof may have a beveled edge 23 ground therein by the grinding wheels 22 whereupon such beveled edges 23 will be polished by suitable polishing wheels embodied in the machine, but not shown, as is well understood in the art.

As the endless conveyor unit 19 is rotated the anti-friction rollers 44 carried thereby ride upon the anti-friction bearing guide members 14 and are, during the outer run of the conveyor unit 19 (Fig. 4), guided by and between the rows of the anti-friction bearing guide members 14a during the inner run of the conveyor unit 19.

During movement of the endless conveyor unit 19 the anti-friction rollers 50 and the blocks 67 carried thereby bear against the wear strips 68, which are attached to the inner wall 17 of the corresponding one of the stationary guideways 12, and serve to keep the parts in proper position. However, in place of the blocks 67 additional anti-friction rollers 50 may be provided or the anti-friction rollers 50 may be replaced by additional blocks 67.

Similarly, during movement of the endless conveyor unit 18 the anti-friction rollers 61 carried thereby ride upon the anti-friction bearing guide members 14, during the outer run of the conveyor unit 18, and these anti-friction rollers 61 are guided between the vertically spaced horizontally extending rows of anti-friction bearing guide members 14a during the inner run of the conveyor unit 18. During this operation the anti-friction rollers 50 carried by the endless conveyor unit 18 ride against the wear strips 68 which are mounted on the inner wall 17 of the other stationary guideway 12.

It will thus be seen from the foregoing description, considered in conjunction with the accompanying drawings, that the present invention provides new and improved endless conveyor units or mechanisms for flat glass edging, beveling and polishing apparatus, and new and improved flat glass plate gripping devices embodied therein, and that the invention thus has the desirable advantages and characteristics, and accomplishing its intended objects including those hereinbefore pointed out and others which are inherent in the invention.

I claim:

1. In a conveyor structure, for transporting plate or sheet glass, having a pair of spaced apart and elongated stationary supports for guiding respective pairs of spaced apart endless conveyor units for gripping said glass to move said glass along a forward path in the conveyor, and in which conveyor said conveyor units are each arranged to move parallel to an inside face of each of the respective stationary supports in a forward direction while gripping said glass and then parallel to an outside face of the respective stationary support in a reverse direction, a plurality of gripping units mounted on each of said conveyor units to face inwardly toward one another, each gripping unit including a flat non-suction resilient gripping pad of a substantial length for flat engagement with said glass along a corresponding substantial length, spaced apart friction rollers mounted at the back of each gripping unit in position to roll along elongated wear strips attached to the said inside face of said stationary supports in spaced relation corresponding to the spacing between said spaced apart friction rollers, and another friction roller carried at the back of each gripping unit intermediate the said spaced apart friction rollers, said other friction roller carried by each gripping unit being in position to roll along a guide track mounted on the inner sides of said respective stationary supports between said wear strips and along a guide track mounted at a corresponding location on the outer sides of said respective supports.

2. A conveyor structure according to claim 1 in which one of the gripping units in said pair of gripping units is yieldably urged toward the said gripping unit by a spring means interposed between the gripping pad and a supporting plate associated therewith mounted at the back of the pad.

3. In a conveyor structure, for transporting plate or sheet glass, having a pair of spaced apart and elongated stationary supports for guiding respective pairs of spaced apart endless conveyor units for gripping said glass to move said glass along a forward path in the conveyor, and in which conveyor said conveyor units are each arranged to move parallel to an inside face of each of the respective stationary supports in a forward direction while gripping said glass and then parallel to an outside face of the respective stationary support in a reverse direction, a plurality of gripping units mounted on each of said conveyor units to face inwardly toward one another, each gripping unit including a flat non-suction resilient gripping pad of a substantial length for flat engagement with said glass along a corresponding substantial length, spaced apart friction rollers attached to the back of each gripping unit in position to roll along elongated wear strips that are mounted on the said inside face of said stationary supports in spaced relation corresponding to the spacing between said spaced apart friction rollers, another friction roller carried at the back of each gripping unit intermediate the said spaced apart friction rollers, said other friction roller carried by each gripping unit being in position to roll along a guide track mounted on the inner sides of said respective stationary supports between said wear strips and along a guide track mounted at a corresponding location on the outer sides of said respective supports, the gripping units corresponding to one of the conveyor units being relatively laterally immovable to thereby afford a back support for said glass sheet, and the gripping units in the other conveyor unit each including springs normally urging such gripping units inwardly toward said one conveyor unit whereby said glass sheet may be yieldably urged toward said back support.

References Cited in the file of this patent

UNITED STATES PATENTS

| | | |
|---|---|---|
| 1,660,350 | Owen | Feb. 28, 1928 |
| 1,728,647 | Weber | Sept. 17, 1929 |
| 1,911,961 | Melnick | May 30, 1933 |
| 2,038,150 | Weber | Apr. 21, 1936 |
| 2,236,751 | Dine | Apr. 1, 1941 |
| 2,551,332 | Moore et al. | May 1, 1951 |